United States Patent
Backstrom et al.

(10) Patent No.: US 10,165,068 B2
(45) Date of Patent: Dec. 25, 2018

(54) SYSTEMS AND METHODS FOR SMART PUBLISHING

(71) Applicant: Facebook, Inc., Menlo Park, CA (US)

(72) Inventors: Lars Seren Backstrom, Mountain View, CA (US); Yun Mao, Jersey City, NJ (US); Guy Dassa, Mamaroneck, NY (US)

(73) Assignee: Facebook, Inc., Menlo Park, CA (US)

( * ) Notice: Subject to any disclaimer, the term of this patent is extended or adjusted under 35 U.S.C. 154(b) by 215 days.

(21) Appl. No.: 14/597,095

(22) Filed: Jan. 14, 2015

(65) Prior Publication Data

US 2016/0205207 A1 Jul. 14, 2016

(51) Int. Cl.
| | |
|---|---|
| *G06F 15/173* | (2006.01) |
| *H04L 29/08* | (2006.01) |
| *G06F 17/30* | (2006.01) |
| *G06Q 50/00* | (2012.01) |

(52) U.S. Cl.
CPC ........ *H04L 67/22* (2013.01); *G06F 17/30867* (2013.01); *G06Q 50/01* (2013.01)

(58) Field of Classification Search
CPC ..... H04L 67/22; H04L 67/146; H04L 12/588; H04L 51/32; G06F 17/30345; G06Q 50/01
USPC ........................................................ 709/224
See application file for complete search history.

(56) References Cited

U.S. PATENT DOCUMENTS

| | | | | |
|---|---|---|---|---|
| 2011/0238670 A1* | 9/2011 | Mercuri | ............. | G06Q 30/0282 707/748 |
| 2011/0314007 A1* | 12/2011 | Dassa | ............... | G06F 17/30893 707/723 |
| 2012/0036026 A1* | 2/2012 | Yankelevich | ....... | G06F 17/3089 705/14.73 |
| 2013/0339447 A1* | 12/2013 | Ervine | .................. | H04L 65/403 709/204 |
| 2015/0256499 A1* | 9/2015 | Kumar | .................... | H04L 51/28 709/206 |

* cited by examiner

*Primary Examiner* — SM A Rahman
(74) *Attorney, Agent, or Firm* — Sheppard Mullin Richter & Hampton LLP (57) ABSTRACT

Systems, methods, and non-transitory computer readable media configured to create objects associated with links to content items shared within a social networking system, the content items from content sources. Content sources having pages on the social networking system fanned by a user are determined. Objects associated with (links to) content items from the content sources having content source representations, such as pages, on the social networking system fanned by the user are collected. An aggregate score for a collected object associated with a link is determined based on popularity of a content item associated with the link within the social networking system and interest of the user in the content item. The collected object associated with the link is provided to be ranked for potential presentation of the link to the user based on satisfaction of a threshold.

14 Claims, 8 Drawing Sheets

SYSTEMS AND METHODS FOR SMART PUBLISHING

FIELD OF THE INVENTION

The present technology relates to the field of content provision. More particularly, the present technology relates to techniques for providing access to previously unshared content from publishers.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. Content items can be presented through associated links that can be selected by the user to access the content items. In some instances, the presented content items may be only a small fraction of available content from the sources of the content. Many other content items from the content sources could be additionally presented to the user. However, toward the goal of optimizing user experience, much consideration is devoted by the social network and by the content sources to balancing competing interests in determining optimal amounts of content to present to the user. On the one hand, the user benefits from receiving relevant content items. On the other hand, the content sources often have large volumes of content items for potential presentation to the user. In this regard, they often error on the side of delivering less so as to avoid characterization of their content as unwanted or, worse yet, spam. As a result, the user may never learn about content that she would otherwise find highly relevant and desirable.

SUMMARY

Various embodiments of the present disclosure can include systems, methods, and non-transitory computer readable media configured to create objects associated with links to content items shared within a social networking system, the content items from content sources. Content sources having pages on the social networking system fanned by a user are determined. Objects associated with (links to) content items from the content sources having pages on the social networking system fanned by the user are collected. An aggregate score for a collected object associated with a link is determined based on popularity of a content item associated with the link within the social networking system and interest of the user in the content item. The collected object associated with the link is provided to be ranked for potential presentation of the link to the user based on satisfaction of a threshold.

In an embodiment, the link includes a URL.

In an embodiment, the links to content items shared within the social networking system are detected.

In an embodiment, it is determined whether a link to a content item shared within the social networking system satisfies a set of criteria before creation of an object associated with the link.

In an embodiment, the set of criteria includes availability of metadata regarding the content item.

In an embodiment, a mapping between domains of the content sources and content source representations, including but not limited to pages of the content sources, on the social networking system is generated.

In an embodiment, objects associated with links that were previously shared by at least one of the content sources and connections of the user are removed.

In an embodiment, the determining an aggregate score for an object associated with a link further comprises determining a score relating to the popularity of the content item associated with the link based on an extent of interactions of users of the social networking system with the content item; and determining a score relating to the interest of the user in the content item based on a comparison between topics reflected in the content item and user interest in topics identified from historical user interactions.

In an embodiment, the score relating to the popularity of the content item and the score relating to the interest of the user in the content item are combined to produce the aggregate score.

In an embodiment, the objects are sorted based on their associated aggregate scores. The highest scoring objects based on the threshold are provided to be ranked for potential presentation to the user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Content from Publishers

People use computing devices (or systems) for a wide variety of purposes. Computing devices can provide different kinds of functionality. Users can utilize their computing devices to produce information, access information, and share information. In some cases, users can use their computing devices to generate, publish, and access content items. Content items can include any combination of content types, such as text, images, videos, and audio. The content items can be shared for consumption by others through a social networking system. The content items can be shared in a variety of formats, such as postings to a social networking system.

Under conventional approaches, a user may be presented with various content items in a social network. For example, the content items can be links to content that are shared by, for example, the source of the content, a connection of the user who consumed the content, or the social networking system. Sharing of links allows the user to enjoy access to a variety of potentially relevant content. However, as social networking systems increase in members and as members increase their available content, conventional techniques to share links (or content) with the user do not provide the user with adequate access to available content that the user may deem most relevant or that the content creator decided not to publish. An undue increase in the amount of links shared with the user also can detract from the ability of the user to access desired content. In this regard, the user can view the presentation of large volumes of content as spam, defeating the goal of enhancing user experience on the social networking system through provision of desired content. For the same reasons, content creators, including publishers, do not share all of their content.

An improved approach to the presentation of content items overcomes the foregoing and other disadvantages associated with conventional approaches. In general, systems and methods of the present disclosure can provide access to content items that a user of a social networking system is likely to find relevant and interesting. In one example, the access to content items can be provided in the form of shared links. The links may be associated with content items (e.g., stories) published on a website of a member of the social networking system (e.g., publisher or other content source). The links may be shared by members across the social networking system. Each time a link is shared, an object associated with each detected link can be created when certain conditions about the link are satisfied. When a page of a publisher on the social networking system is liked by the user, all objects associated with links to content items from the publisher can be collected.

The objects associated with links that have already been shared by the publisher or by connections of the user can be removed from further consideration. Further, a prefiltering technique can be applied to the remaining objects associated with the links. The prefiltering technique can involve a determination of popularity of the content item associated with each link and a determination of user interest in the content item. The determination of popularity can relate to the popularity of the content item associated with the link as to all members of the social networking system as a whole. As described in more detail herein, the determination of popularity can be based on various factors, including, for example, number of shares, comments, and likes that the content item has received combined together with weights to produce a popularity score. The determination of popularity can result in an associated score reflecting the extent of the popularity of the content item. The determination of user interest can relate to the interest that the user may have in topics reflected by the content item associated with the link. The determination of user interest can result in an associated score reflecting the extent of the user interest in the content item. As discussed in more detail herein, the extent of user interest can be determined based on recent activities with similar content (at a higher, general level or at a lower, specific level), providing a signal for determining the extent of user interest. The score relating to popularity and the score relating to user interest can be combined to result in an aggregate score for the object. Aggregate scores can be generated for all of the remaining objects. The remaining objects can be sorted by their overall scores. A threshold number of the highest scoring objects can be selected. The selected objects and associated links can be provided to a technique that determines a ranking of content items to be potentially presented to the user.

Figure 1:
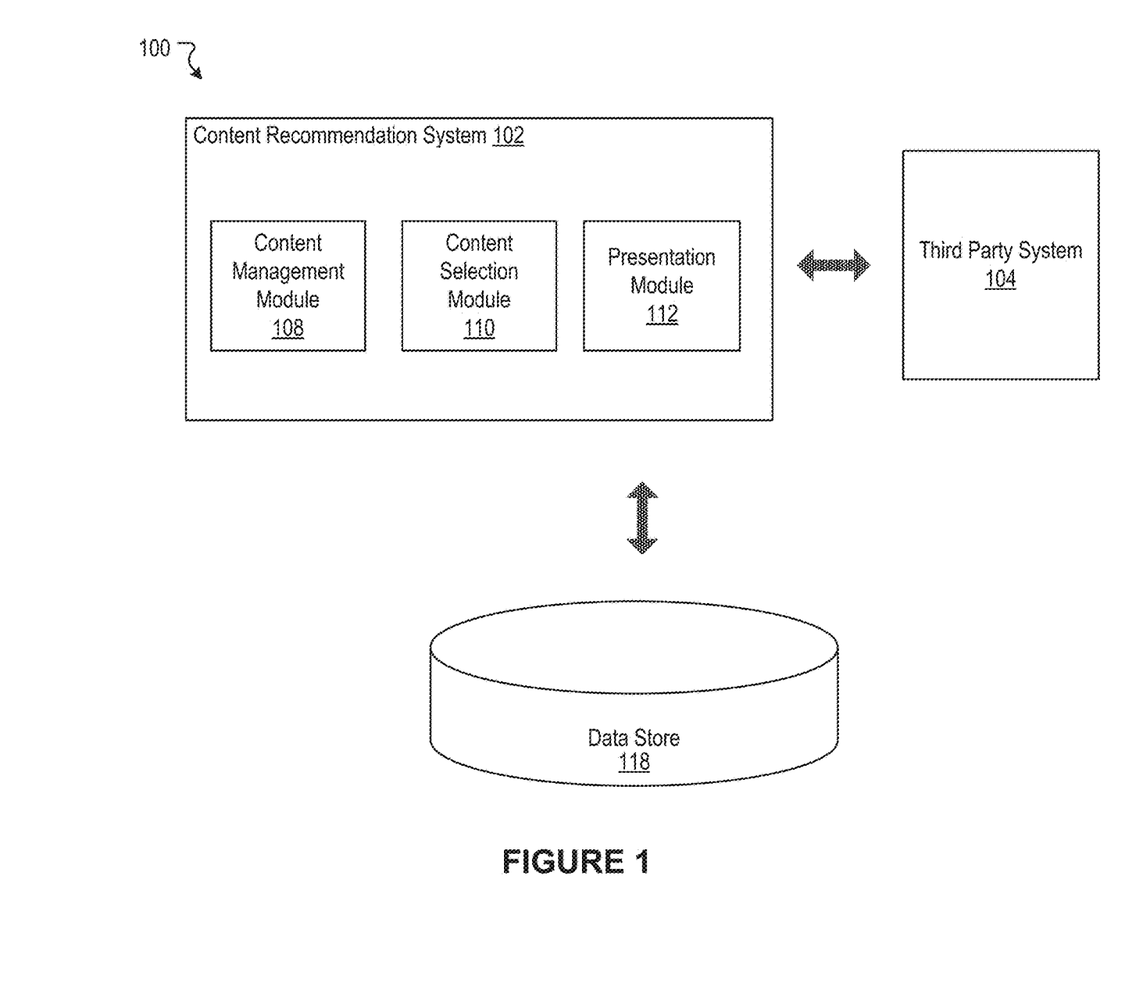
FIG. 1 illustrates a system including an example content recommendation system and a third party system, according to an embodiment of the present disclosure.

FIG. 1 illustrates an example system 100 including an example content recommendation system 102 configured to interact with a third party system 104 to select links associated with content items for potential presentation to a user, according to an embodiment of the present disclosure. A link (or content entity) can include any address, expression, locator, or other vehicle (e.g., URL) through which a user can access a content item. A content item can include one or more of a story, article, description, account, interview, text, image, video, audio, etc. Content items can be published by the third party system 104. The third party system 104 can include one or more publishers of content items. A publisher can maintain one or more websites to publish the content items and also can be a member of a social networking system that maintains or administers one or more associated pages on the social networking system. In some embodiments, the third party system 104 can be implemented as a third party system 620 (shown in FIG. 6) to allow communications and sharing of content items hosted by the third party system 104 among users of the social networking system. Links to content items from the website of the publisher can be shared by any members of the social networking system. The content recommendation system 102 can select shared links to content items for potential presentation to a user. Although a link is described in connection with some embodiments, any other types of objects that can attach (or link to) content (e.g., videos, games, etc.) or any other types of content items that are sharable and that can be attributed to a content source entity that operates in a social networking system can be used in other embodiments.

The content recommendation system 102 can include a content management module 108, a content selection module 110, and a presentation module 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content recommendation system 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content recommendation system 102 can be implemented, in part or in whole, as software running on one or more computing devices or systems, such as on a server or client computing device. For example, the content recommendation system 102 can be implemented as or within an application (e.g., app), a program, or an applet, etc., running on a user computing device or client computing system. In some instances, the content recommendation system 102 can, in part or in whole, be implemented within or configured to operate in conjunction with a social networking system (or service), such as the social networking system 630 of FIG. 6. It should be understood that many variations are possible.

The content management module 108 can detect and monitor within the social networking system the sharing of links to content items from the websites of publishers. An object can be potentially created based on each shared link. The content management module 108 can apply, for each shared link, a set of criteria to determine whether to create the corresponding object. The set of criteria can include, for example, a set of metadata that must be available regarding the content item associated with the shared link. The content management module 108 can collect all of the objects associated with publishers having pages on the social networking system that have been fanned by the user. The content management module 108 is discussed in more detail in connection with FIG. 2.

The content selection module 110 can select objects and associated shared links for potential presentation to the user. Initially, the content selection module 110 can remove from the collected objects those objects that are associated with links that have already been shared by the publisher or by a connection of the user. The content selection module 110 then can apply a prefiltering process to determine a popularity score for each object and determine an interest score for each object. The popularity score can be based on the extent to which members of the social networking system have expressed interest in the content item associated with the object. The interest score can be based on the extent to which the user in particular is likely to have interest in topics reflected by the content item associated with the object. The popularity score and the interest score can be combined to produce an aggregate score for each object. The objects can be sorted based on their aggregate scores. The top scoring objects and associated links can be provided to the presentation module 112. The content selection module 110 is discussed in more detail in connection with FIG. 3.

The presentation module 112 can determine content items to present to the user. The presentation module 112 can receive the top scoring objects and associated links determined by the content selection module 110. In addition, the presentation module 112 can receive other content items for potential presentation to the user. Other content items can be determined by other functionality of the social networking system and can include, for example, postings by connections, other postings by publishers, advertisements, suggestion of connections for the user, etc. The presentation module 112 can rank all of the available content items, including the content items associated with the top scoring objects and associated links determined by the content selection module 110, for potential presentation to the user according to one or more techniques. The highest ranking content items can be presented to the user.

The data store 118 can be configured to store and maintain various types of data, such as the data relating to the potential presentation of shared links to the user. The data can include data relating to, for example, sharing of links, the set of criteria on which to create an object, the mappings between websites (domains) of publishers and the content source representations, such as pages of the publishers, on the social networking system, the created objects and related metadata, pages liked by the user, links already shared by publishers and connections of the user, the interactions of users with shared links, the topics associated with shared links, etc. The data store 118 can also maintain data regarding the historical behavior of the user throughout the social networking system and, in particular, the interactions of the user with various content items of the social networking system and the topics reflected by those content items.

The data store 118 can also maintain other information associated with the social networking system. The information associated with the social networking system can include data about users, social connections, social interactions, locations, geo-fenced areas, maps, places, events, groups, posts, communications, content, account settings, privacy settings, and a social graph. The social graph can reflect the sharing of links and creation of objects based on the shared links. As shown in the example system 100, the content recommendation system 102 can be configured to communicate and/or operate with the data store 118.

Figure 2:
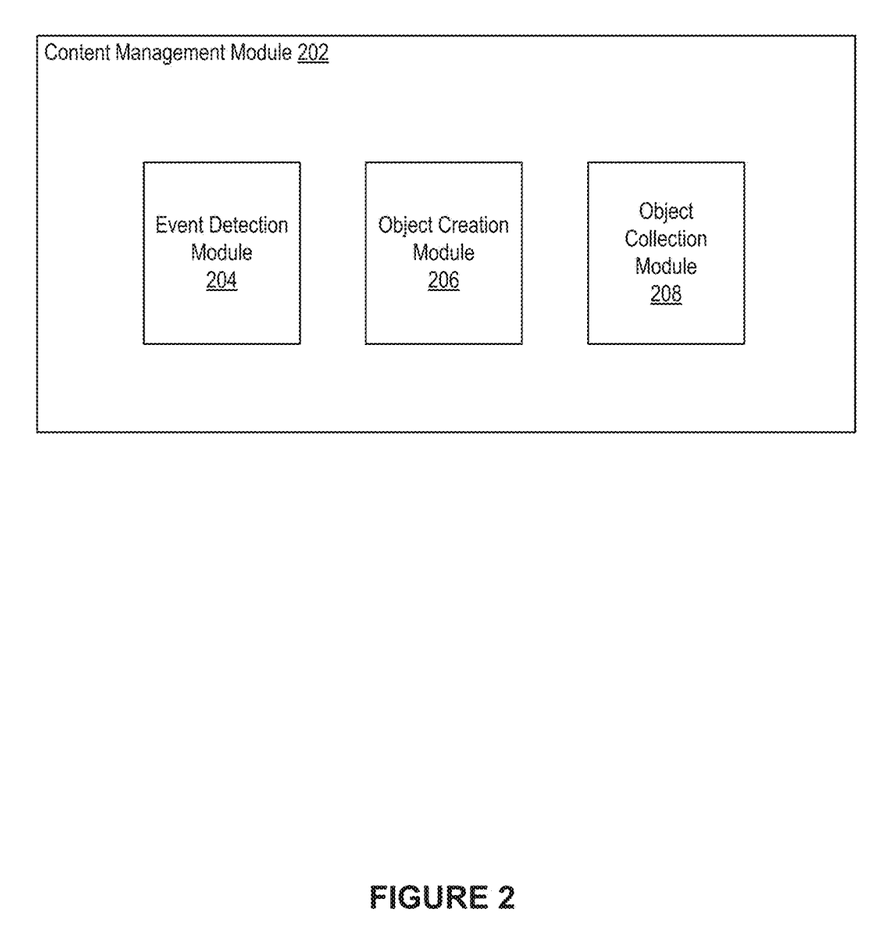
FIG. 2 illustrates an example content management module, according to an embodiment of the present disclosure.

FIG. 2 illustrates an example content management module 202, according to an embodiment of the present disclosure. In some embodiments, the content management module 108 of FIG. 1 can be implemented with the content management module 202. As shown in the example of FIG. 2, the content management module 202 can include an event detection module 204, an object creation module 206, and an object collection module 208.

The event detection module 204 can detect and monitor within the social networking system the sharing by members of the social networking system of links to content items from websites of publishers. The event detection module 204 can identify all links to content items from publishers that are shared within the social networking system. An object can be potentially created based on each link. The object can represent the link in a social graph representing all entities and interactions of the social networking system. In some embodiments, the content management module 202 need not detect the sharing of a link to identify a content item for which an object may be potentially created. In this regard, the content management module 202 can additionally or alternatively identify content items of publishers through other techniques, such as scraping the content of the publishers, RSS feeds, etc.

The object creation module 206 can apply, for each shared link, a set of criteria to determine whether to create a corresponding object. The set of criteria can include, for example, requirements that certain metadata is available regarding the content item associated with the link. For example, the set of criteria can provide that the content item associated with the shared link must have tags, a title (or title of sufficient length), and an image. The tags can include additional metadata about the content item that help to ensure that the content item is suitable for potential presentation to the user. In some embodiments, the metadata about the content item need not come from the tags. For example, the content management module 202 can scrape or crawl the content item or associated pages on the website of the publisher to obtain metadata about the content item to determine its suitability for presentation. In some instances, the set of criteria can be based on one or more heuristics that can inform whether the content item is suitable for presentation to the user.

When the set of criteria is satisfied, the object associated with the link can be created. In one instance, an object for a shared link is created the first time that the link is shared within the social networking system. All of the objects that are created can be collected and provided to the object collection module 208.

The object collection module 208 can obtain all of the objects associated with publishers having pages on the social networking system that have been fanned by the user. The object collection module 208 can identify all of the websites of a publisher and their associated domains. The websites of the publisher and their associated domains can be distinct from the website associated with the social networking system. The object collection module 208 can identify all of the pages on the social networking system associated with the publisher. Accordingly, the object collection module 208 can perform, with respect to a publisher, a many to many mapping between websites (or domains) of the publisher and content source representations, such as pages relating to the publisher, on the social networking system. In particular, if a link such as a URL to a content item is shared, the object collection module 208 can analyze the associated object to identify the publisher based on, for example, the domain reflected in the URL. If the publisher is associated with a page on the social networking system that the user fanned, the object can be collected. All objects associated with publishers having pages on the social networking system that the user has fanned can be collected.

Figure 3:
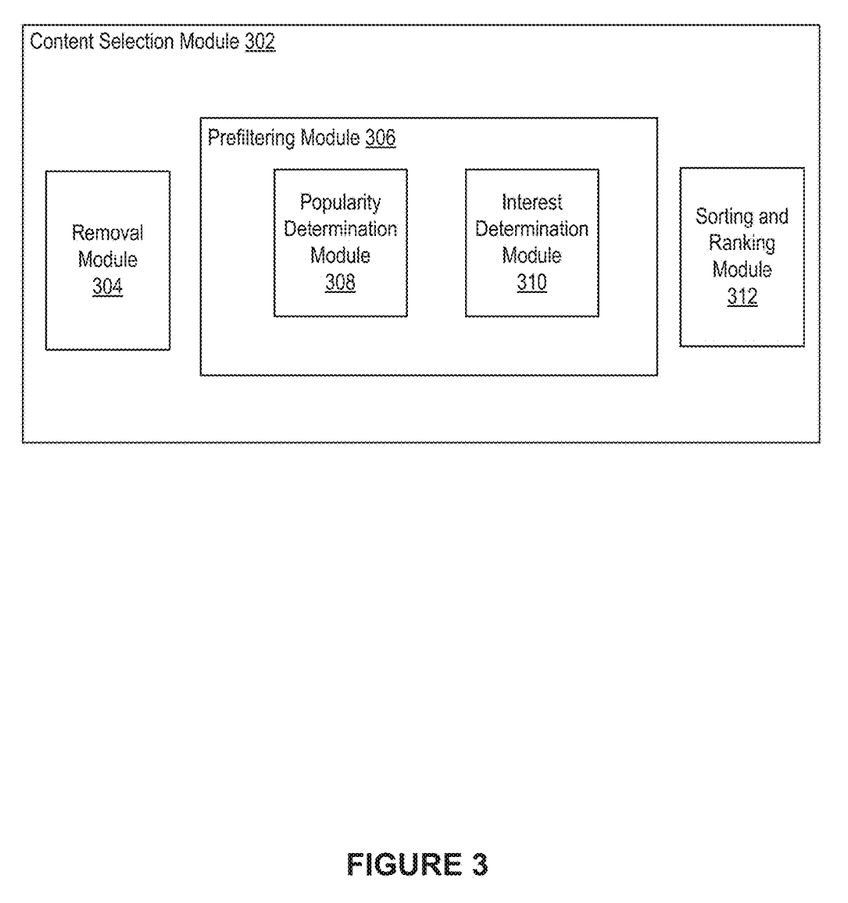
FIG. 3 illustrates an example content selection module, according to an embodiment of the present disclosure.

FIG. 3 illustrates an example content selection module 302, according to an embodiment of the present disclosure. In some embodiments, the content selection module 110 of FIG. 1 can be implemented with the content selection module 302. As shown in the example of FIG. 3, the content selection module 302 can include a removal module 304, a prefiltering module 306 having a popularity determination module 308 and an interest determination module 310, and a sorting and ranking module 312.

The removal module 304 can receive the collected objects associated with publishers having pages on the social networking system that the user has fanned, as determined by the objection collection module 208. The objects corresponding to links already shared by the publisher can be removed from further consideration. Additionally or alternatively, the objects corresponding to links already shared by connections of the user can be removed from further consideration. The remaining objects can be provided to the prefiltering module 306.

The popularity determination module 308 can determine the popularity of the object and associated link based on one or more of a variety of considerations informing popularity. For example, the popularity of the object can be based in whole or in part on a number of times the associated link has been shared, liked, or commented on across the social networking system. In particular, the popularity of the object can be based on a number of times the associated link has been shared, liked, or commented on by any users of the social networking system, a number of times the associated link has been shared, liked, or commented on by unique users of the social networking system, etc. As another example, the popularity of the object can be based in whole or in part on a number of times the associated link has been selected across the social networking system. As yet another example, the popularity of the object can be based in whole or in part on an aggregated (e.g., average) duration of time that users access the content item associated with the object. Any number of techniques can be used to determine the popularity of the object. The popularity determination module 308 can produce a score (e.g., numerical score) reflecting the popularity of the object based on the considerations informing popularity.

The interest determination module 310 can determine a level of interest of the user in the object. The interest determination module 310 can compare topics reflected by a shared link or associated content item with a history of interactions of the user that indicate the user's interests in certain topics. Topics to which a shared link and related content item relate can be determined from the content item and interactions with the content item. For example, when the content item includes text, one or more natural language processing techniques can be used to identify topics from the text. As another example, when the content item includes an image, object recognition and image analysis techniques can be used to identify topics reflected by the image. In addition, comments, tags, and metadata associated with the shared link or related content item can be used to identify topics reflected by the content item. Further, the interest determination module 310 can analyze postings in response to the shared link to identify topics reflected by the content item. Related topics at a relatively granular level can be organized in or mapped to topic clusters at a relatively higher level. Other techniques to identify topics from shared links or their associated content items are possible.

The interest of the user in certain topics can be determined by a history of user interactions within the social networking system. User interactions can include access to a page or content item, selecting a page or content item, liking a page or content item, etc. The pages and content items with which the user has interacted can be associated with certain topics that are organized in or mapped to topic clusters. A historical counter of user interactions with each topic cluster can be maintained. For each instance of a user interacting with or otherwise indicating an interest in a page or content item associated with a certain topic associated with a topic cluster, a counter for the topic cluster that relates to the user can be incremented. The counters for various topic clusters can provide an indication of the extent of the interest (affinity) of the user with respect to different topics.

The interest determination module 310 can determine a level of interest of the user in the object based on a comparison of the topics reflected by the associated content item and the affinity of the user with respect to the topics. In some instances, the comparison can be performed by any of a variety of techniques, such as cosine similarity. The interest determination module 310 can produce a score (e.g., numerical score) reflecting the level of interest of the user in the object.

The prefiltering module 306 can combine the score reflecting the popularity of the object and the score reflecting the level of interest of the user in the object to produce an aggregate score. For example, the combination can be a summation or a multiplication of the two scores. As another example, the combination can include weighting factors so that the score reflecting popularity of the object and the score reflecting the level of interest of the user in the object can be suitably weighted by their relative importance.

The sorting and ranking module 312 can sort the objects based on their aggregate scores. In some embodiments, a threshold number of the top scoring objects can be provided to the presentation module 112 for potential presentation to the user. In some embodiments, the objects having aggregate scores that are equal to or greater than a threshold value of an aggregate score can be provided to the presentation module 112 for potential presentation to the user.

Figure 4:
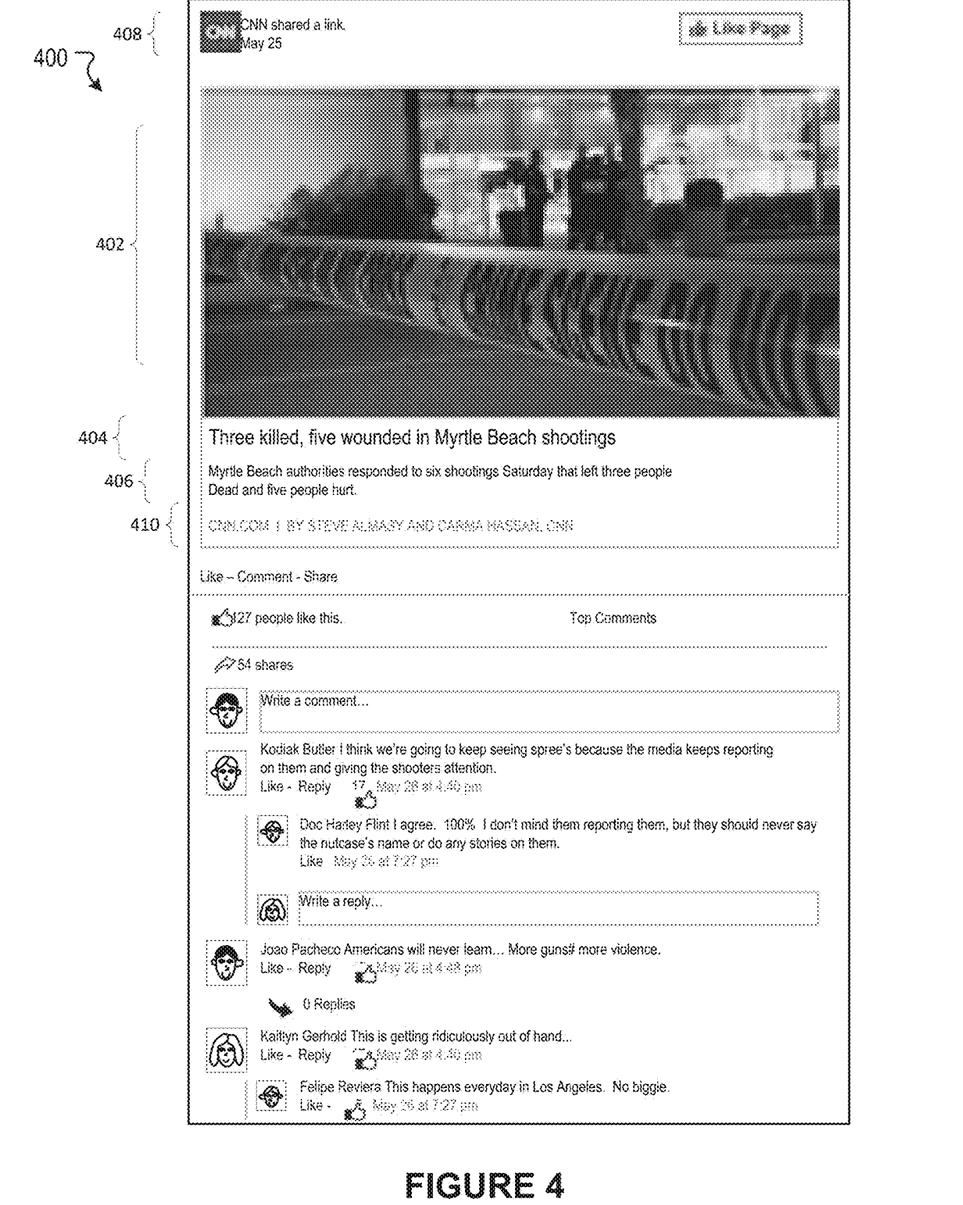
FIG. 4 illustrates an example screen, according to an embodiment of the present disclosure.

FIG. 4 illustrates an example screen 400, according to an embodiment of the present disclosure. The screen 400 can be a screen of a user interface of a computing system for presenting or utilizing various embodiments, components, and/or features of the present disclosure. The screen 400 represents the presentation of references relating to a content item after a corresponding object and shared link have been selected for presentation by the presentation module 112. In the depicted example, the presentation of references relating to the content item is made in a news feed of an account of a user on a social networking system. In other instances, the presentation of the references relating to the content item can be made elsewhere. In the depicted example, the content item is a story (article) published on the website of a publisher. The screen 400 includes various references to the story, including an image 402 relating to the story, a title 404 of the story, and a brief description 406 of the story. The screen also includes identifications 408, 410 of the publisher responsible for the story as well as an identification of the website of the publisher where the story is published. The screen 400 also includes comments and responses regarding the story from various connections of the user and members of the social networking system. One or more references to the story, such as the image 402 or the title 404, can be selected by the user. Upon selection by the user of the references, the user can be directed to the website of the publisher to access the story.

Figure 5A:
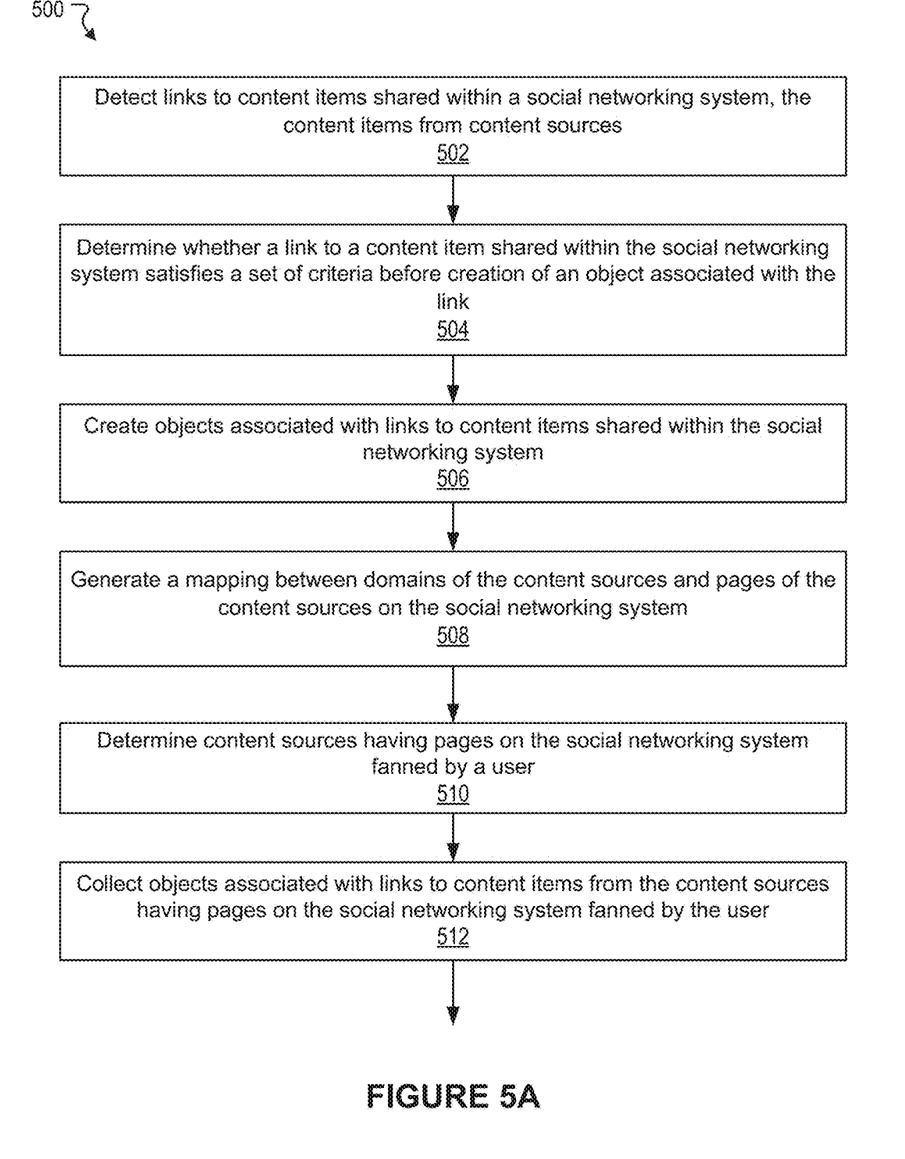
FIGS. 5A-5B illustrate an example method, according to an embodiment of the present disclosure.
Figure 5B:
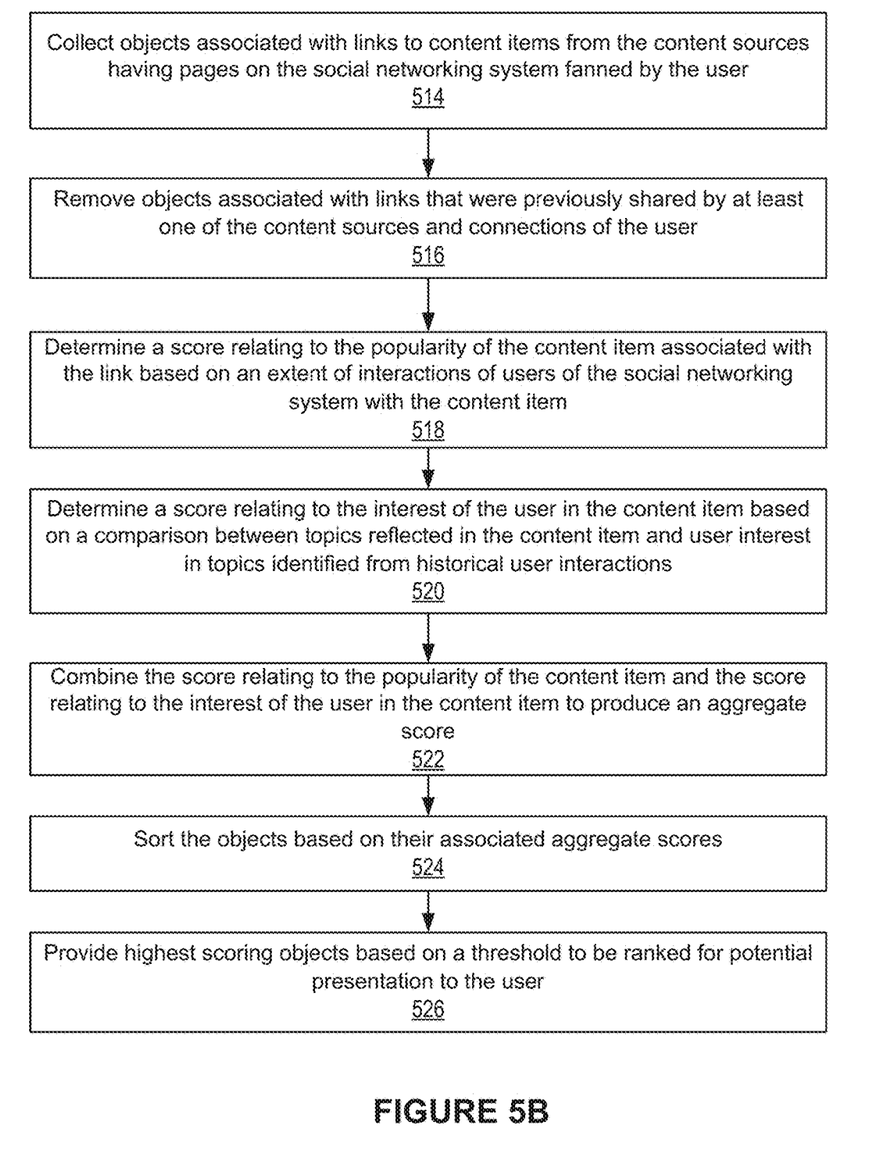

FIGS. 5A-5B illustrate an example method 500, according to an embodiment of the present disclosure. It should be appreciated that there can be additional, fewer, or alternative steps performed in similar or alternative orders, or in parallel, within the scope of the various embodiments unless otherwise stated.

At block 502, the method 500 can detect links to content items shared within a social networking system, the content items from content sources. At block 504, the method 500 can determine whether a link to a content item shared within the social networking system satisfies a set of criteria before creation of an object associated with the link. At block 506, the method 500 can create objects associated with links to content items shared within the social networking system. At block 508, the method 500 can generate a mapping between domains of the content sources and pages of the content sources on the social networking system. At block 510, the method 500 can determine content sources having pages on the social networking system fanned by a user. At block 512, the method 500 can collect objects associated with links to content items from the content sources having pages on the social networking system fanned by the user.

At block 514, the method 500 can collect objects associated with links to content items from the content sources having pages on the social networking system fanned by the user. At block 516, the method 500 can remove objects associated with links that were previously shared by at least one of the content sources and connections of the user. At block 518, the method 500 can determine a score relating to the popularity of the content item associated with the link based on an extent of interactions of users of the social networking system with the content item. At block 520, the method 500 can determine a score relating to the interest of the user in the content item based on a comparison between topics reflected in the content item and user interest in topics identified from historical user interactions. At block 522, the method 500 can combine the score relating to the popularity of the content item and the score relating to the interest of the user in the content item to produce an aggregate score. At block 524, the method 500 can sort the objects by their associated aggregate scores. At block 526, the method can provide highest scoring objects based on a threshold to be ranked for potential presentation to the user. Other suitable techniques are possible.

Social Networking System—Example Implementation

Figure 6:
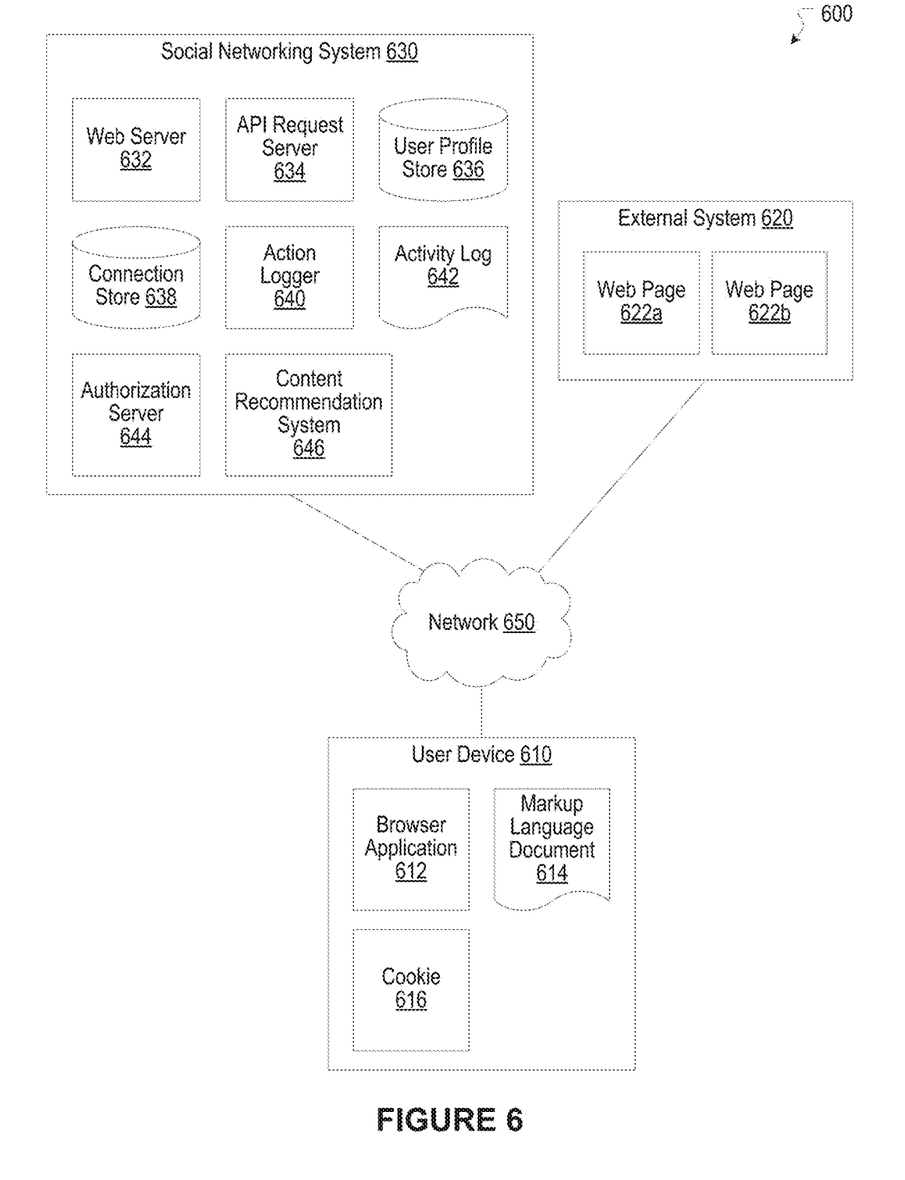
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content recommendation system 646. The content recommendation system 646 can be implemented with the content recommendation system 102.

Hardware Implementation

Figure 7:
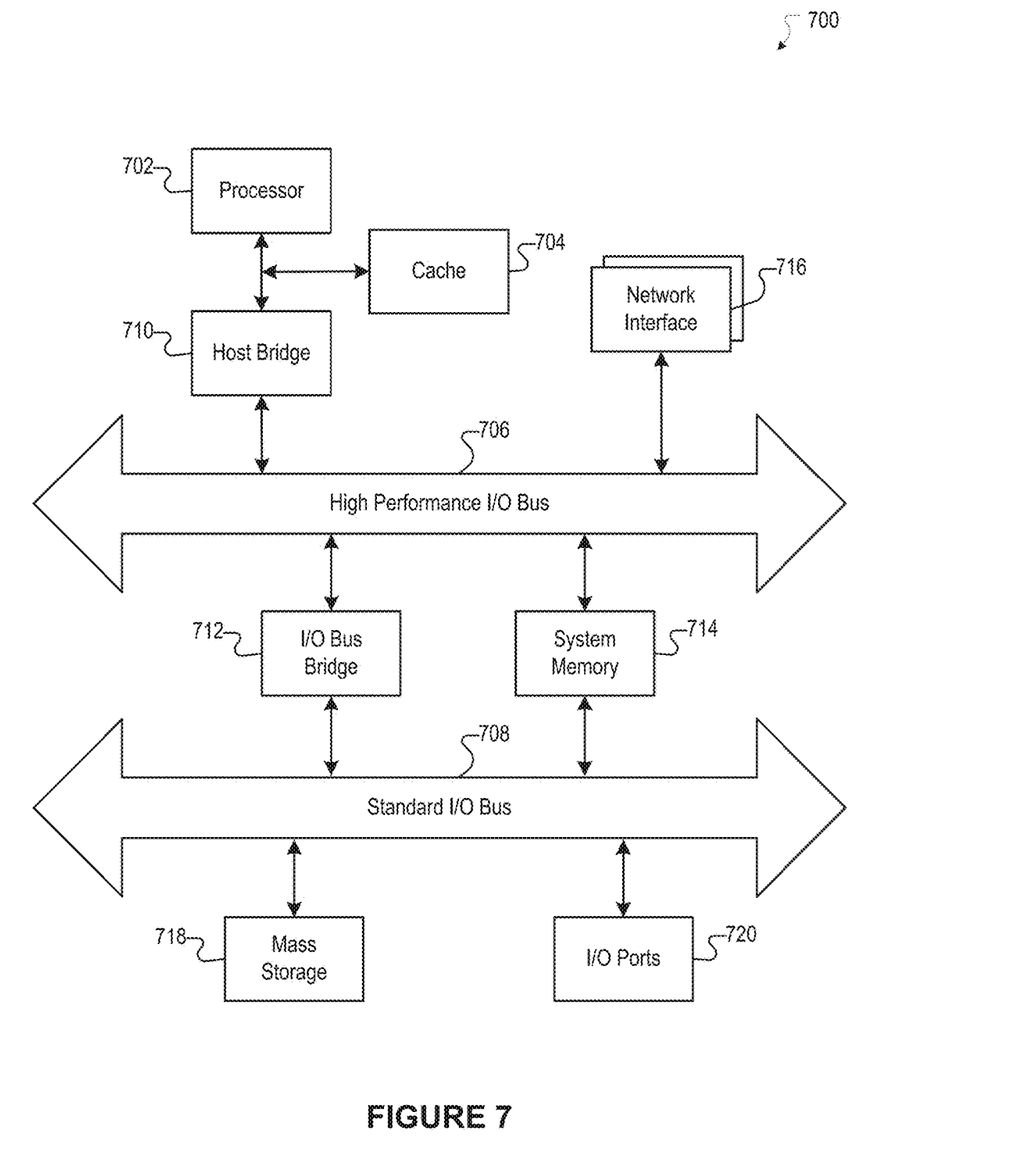
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    creating, by a computing system, objects associated with links to content items in response to sharing of the links within a social networking system and determination that the links satisfy a set of criteria;
    determining, by the computing system, content sources having pages on the social networking system engaged with by a user;
    collecting, by the computing system, objects associated with links to content items from the content sources having pages on the social networking system in response to the user engaging with the pages;
    determining, by the computing system, an aggregate score for a collected object associated with a link based on popularity of a content item associated with the link within the social networking system and interest of the user in the content item, wherein the determining an aggregate score for a collected object associated with a link includes:
        determining a score relating to the popularity of the content item associated with the link based on interactions of users of the social networking system with the content item; and
        determining a score relating to the interest of the user in the content item based on a comparison between topics reflected in the content item and user interest in topics identified from historical user interactions;
    providing, by the computing system, the collected object associated with the link to be ranked for potential presentation of the link to the user based on satisfaction of a threshold; and
    providing, by the computing system, the link through the social networking system for presentation to the user based on the satisfaction of the threshold.

2. The computer-implemented method of claim 1, wherein the link includes a URL.

3. The computer-implemented method of claim 1, further comprising:
    detecting the links to content items shared within the social networking system.

4. The computer-implemented method of claim 1, wherein the set of criteria includes availability of metadata regarding the content item.

5. The computer-implemented method of claim 1, further comprising:
    generating a mapping between domains of the content sources and content source representations on the social networking system.

6. The computer-implemented method of claim 1, further comprising:
    removing objects associated with links that were previously shared by at least one of the content sources and connections of the user.

7. The computer-implemented method of claim 1, further comprising:
    combining the score relating to the popularity of the content item and the score relating to the interest of the user in the content item to produce the aggregate score.

8. The computer-implemented method of claim 7, further comprising:
    sorting the objects based on their associated aggregate scores; and
    providing highest scoring objects based on the threshold to be ranked for potential presentation to the user.

9. A system comprising:

at least one processor; and a memory storing instructions that, when executed by the at least one processor, cause the system to perform:

creating objects associated with links to content items in response to sharing of the links within a social networking system and determination that the links satisfy a set of criteria;

determining content sources having pages on the social networking system engaged with by a user;

collecting objects associated with links to content items from the content sources having pages on the social networking system in response to the user engaging with the pages;

determining an aggregate score for a collected object associated with a link based on popularity of a content item associated with the link within the social networking system and interest of the user in the content item, wherein the determining an aggregate score for a collected object associated with a link includes:

determining a score relating to the popularity of the content item associated with the link based on interactions of users of the social networking system with the content item; and determining a score relating to the interest of the user in the content item based on a comparison between topics reflected in the content item and user interest in topics identified from historical user interactions;

providing the collected object associated with the link to be ranked for potential presentation of the link to the user based on satisfaction of a threshold; and providing, by the computing system, the link through the social networking system for presentation to the user based on the satisfaction of the threshold.

10. The system of claim 9, further comprising:

generating a mapping between domains of the content sources and content source representations on the social networking system.

11. The system of claim 9, further comprising:

removing objects associated with links that were previously shared by at least one of the content sources and connections of the user.

12. A non-transitory computer-readable storage medium including instructions that, when executed by at least one processor of a computing system, cause the computing system to perform a method comprising:

creating objects associated with links to content items in response to sharing of the links within a social networking system and determination that the links satisfy a set of criteria;

determining content sources having pages on the social networking system engaged with by a user;

collecting objects associated with links to content items from the content sources having pages on the social networking system in response to the user engaging with the pages;

determining an aggregate score for a collected object associated with a link based on popularity of a content item associated with the link within the social networking system and interest of the user in the content item, wherein the determining an aggregate score for a collected object associated with a link includes:

determining a score relating to the popularity of the content item associated with the link based on interactions of users of the social networking system with the content item; and determining a score relating to the interest of the user in the content item based on a comparison between topics reflected in the content item and user interest in topics identified from historical user interactions;

providing the collected object associated with the link to be ranked for potential presentation of the link to the user based on satisfaction of a threshold; and providing, by the computing system, the link through the social networking system for presentation to the user based on the satisfaction of the threshold.

13. The non-transitory computer-readable storage medium of claim 12, further comprising:

generating a mapping between domains of the content sources and content source representations on the social networking system.

14. The non-transitory computer-readable storage medium of claim 12, further comprising:

removing objects associated with links that were previously shared by at least one of the content sources and connections of the user.

* * * * *